(12) United States Patent
Krishnan

(10) Patent No.: US 7,599,534 B2
(45) Date of Patent: Oct. 6, 2009

(54) CAD (COMPUTER-AIDED DECISION) SUPPORT SYSTEMS AND METHODS

(75) Inventor: Arun Krishnan, Exton, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 917 days.

(21) Appl. No.: 10/918,002

(22) Filed: Aug. 13, 2004

(65) Prior Publication Data

US 2005/0102315 A1    May 12, 2005

Related U.S. Application Data

(60) Provisional application No. 60/494,663, filed on Aug. 13, 2003.

(51) Int. Cl.
*G06K 9/00* (2006.01)
(52) U.S. Cl. .............................. 382/128; 128/922; 378/4
(58) Field of Classification Search ................. 382/100, 382/128, 129, 130, 131, 132, 133; 128/922; 378/4–27
See application file for complete search history.

(56) References Cited

U.S. PATENT DOCUMENTS 5,832,103 A    11/1998   Giger et al. .................. 382/130
2002/0054700 A1   5/2002   Karssemeijer et al.
2002/0076091 A1 * 6/2002   Wang ........................... 382/132
2002/0106119 A1 * 8/2002   Foran et al. ................... 382/133
2002/0164061 A1 * 11/2002  Paik et al. ..................... 382/131
2003/0165262 A1 * 9/2003   Nishikawa et al. ........... 382/128
2004/0008876 A1 * 1/2004   Lure et al. .................... 382/128
2004/0068167 A1 * 4/2004   Hsieh et al. ................... 600/407

FOREIGN PATENT DOCUMENTS

WO           9949775 A2      10/1999

OTHER PUBLICATIONS

WO 03/040987 A (Siemens Corp Res Inc) May 15, 2003 p. 11, line 16—p. 13, line 12.

* cited by examiner

*Primary Examiner*—Anand Bhatnagar

(57) ABSTRACT

CAD (computer-aided decision) support systems, methods and tools are provided for automated decision support for screening, evaluating, and/or diagnosing medial conditions. For example, CAD support systems and tools implement methods for automatically processing patient data for a subject patient using various interpretation methods, and integrally rendering and presenting the interpretation results to a user (e.g., physician, radiologist, etc.) in a manner that enables fast and efficient screening, evaluation, and/or diagnosis of potential medical conditions of the subject patient.

15 Claims, 5 Drawing Sheets

CAD (COMPUTER-AIDED DECISION) SUPPORT SYSTEMS AND METHODS

CROSS-REFERENCE TO RELATED APPLICATION

This application claims priority to U.S. Provisional application Ser. No. 60/494,663, filed on Aug. 13, 2003, which is fully incorporated herein by reference.

TECHNICAL FIELD OF THE INVENTION

The present invention relates generally to CAD (computer-aided decision) support systems, methods and tools which provide automated decision support for screening, evaluating, and/or diagnosing medial conditions. More specifically, the present invention relates to CAD support systems and tools, which implement methods for automatically processing patient data for a subject patient using various interpretation methods and presenting the interpretation results to a user (e.g., physician, radiologist, etc.) in a manner that enables fast and efficient screening/evaluation/diagnosis of potential medical conditions of the subject patient.

BACKGROUND

In the field of medical imaging, various systems have been developed for generating medical images of various anatomical structures of individuals for the purpose of screening and evaluating medical conditions. These imaging systems include, for example, CT (computed tomography) imaging, MRI (magnetic resonance imaging), X-ray systems, ultrasound systems, PET (positron emission tomography) systems, etc. Each imaging modality may provide unique advantages over other modalities for screening and evaluating certain types of diseases, medical conditions or anatomical abnormalities, including, for example, colonic polyps, aneurisms, lung nodules, calcification on heart or artery tissue, cancer micro calcifications or masses in breast tissue, and various other lesions or abnormalities.

For example, as is well known in the art, CT (computed tomography) imaging systems can be used to obtain a set of cross-sectional images or 2D "slices" of a ROI (region-of-interest) of a patient for purposes of imaging organs and other anatomies. The CT imaging modality is commonly employed for purposes of diagnosing disease because such modality provides a more precise image that illustrates the size, shape, and location of various anatomical structures such as organs, soft tissues, and bones, and also enables a more accurate evaluation of lesions and abnormal anatomical structures such as cancer, polyps, etc.

One conventional method that physicians, clinicians, radiologists, etc, use for detecting, diagnosing or otherwise evaluating medical conditions is to manually review hard-copies (X-ray films, prints, photographs, etc) of medical images that are reconstructed from an acquired image dataset, to discern characteristic features of interest. For example, CT image data that is acquired during a CT examination can be used to produce a set of 2D medical images (X-ray films) that can be viewed to identify potential abnormal anatomical structures or lesions, for example, based upon the skill and knowledge of the reviewing physician, clinician, radiologist, etc. For example, a mammogram procedure may produce a set of medical images that include normal anatomical structures corresponding to breast tissue, but a trained radiologist may be able identify small lesions among these structures that are potentially cancerous. However, human error may cause a trained radiologist, physician, clinician, etc., to misdiagnose a medical condition such as breast cancer when manually reviewing such medical images.

Accordingly, various data processing systems and tools have been developed to assist physicians, clinicians, radiologists, etc, in evaluating medical images to identify and/or diagnose medical conditions. For example, CAD support systems and tools have been developed for various clinical applications for processing medical images and providing automated detection, evaluation, diagnosis, etc. of medical conditions using medical images. More specifically, by way of example, conventional CAD systems employ image data processing methods to automatically detect and diagnose potential medical conditions including, for example, lesions and other abnormal anatomical structures such as colonic polyps, aneurisms, lung nodules, calcification on heart or artery tissue, micro calcifications or masses in breast tissue, disease states, etc. When the processed image data is rendered and displayed, the CAD detected regions of interest in the displayed image are "marked" or otherwise highlighted to direct the attention of the user (e.g., physician, radiologist, etc.) to assess such CAD detected regions of interest.

Moreover, conventional CAD systems enable a user to invoke an interpretation tool while reviewing a particular (selected) CAD mark to process the image data and obtain results that can aid the user in evaluating or diagnosing the marked region. With such conventional CAD tools, review of CAD marks requires the user to separately invoke one interpretation tool at a given time for each CAD mark. Such process can be time consuming and user-unfriendly when, for instance, a relatively large amount of marked regions must be reviewed and the tools individually invoked.

SUMMARY OF THE INVENTION

Exemplary embodiments of the invention generally include CAD (computer-aided decision) support systems, methods and tools which provide automated decision support for screening, evaluating, and/or diagnosing medial conditions. More specifically, exemplary embodiments of the invention include CAD support systems and tools, which implement methods for automatically processing patient data for a subject patient using various interpretation methods and presenting the interpretation results to a user (e.g., physician, radiologist, etc.) in a manner that enables fast and efficient screening, evaluation, and/or diagnosis of potential medical conditions of the subject patient.

These and other exemplary embodiments, features and advantages of the present invention will be described or become apparent from the following detailed description of exemplary embodiments, which is to be read in connection with the accompanying drawings.

DETAILED DESCRIPTION OF EXEMPLARY EMBODIMENTS

Exemplary embodiments of the invention as described herein generally include CAD (computer-aided decision) support systems, methods and tools, which provide automated decision support to assist healthcare providers for screening, evaluating, and/or diagnosing medial conditions. It is to be understood that the systems and methods described herein in accordance with the present invention may be implemented in various forms of hardware, software, firmware, special purpose processors, or a combination thereof. In one exemplary embodiment of the invention, systems and methods described herein can be implemented in software comprising program instructions that are tangibly embodied on one or more program storage devices (e.g., magnetic floppy disk, RAM, CD Rom, DVD, ROM, disk memory, flash memory, etc.), and executable by any device or machine comprising suitable architecture. It is to be further understood that because the constituent system modules and method steps depicted in the accompanying Figures can be implemented in software, the actual connections between the system components (or the flow of the process steps) may differ depending upon the manner in which the application is programmed. Given the teachings herein, one of ordinary skill in the related art will be able to contemplate these and similar implementations or configurations of the present invention.

Figure 1:
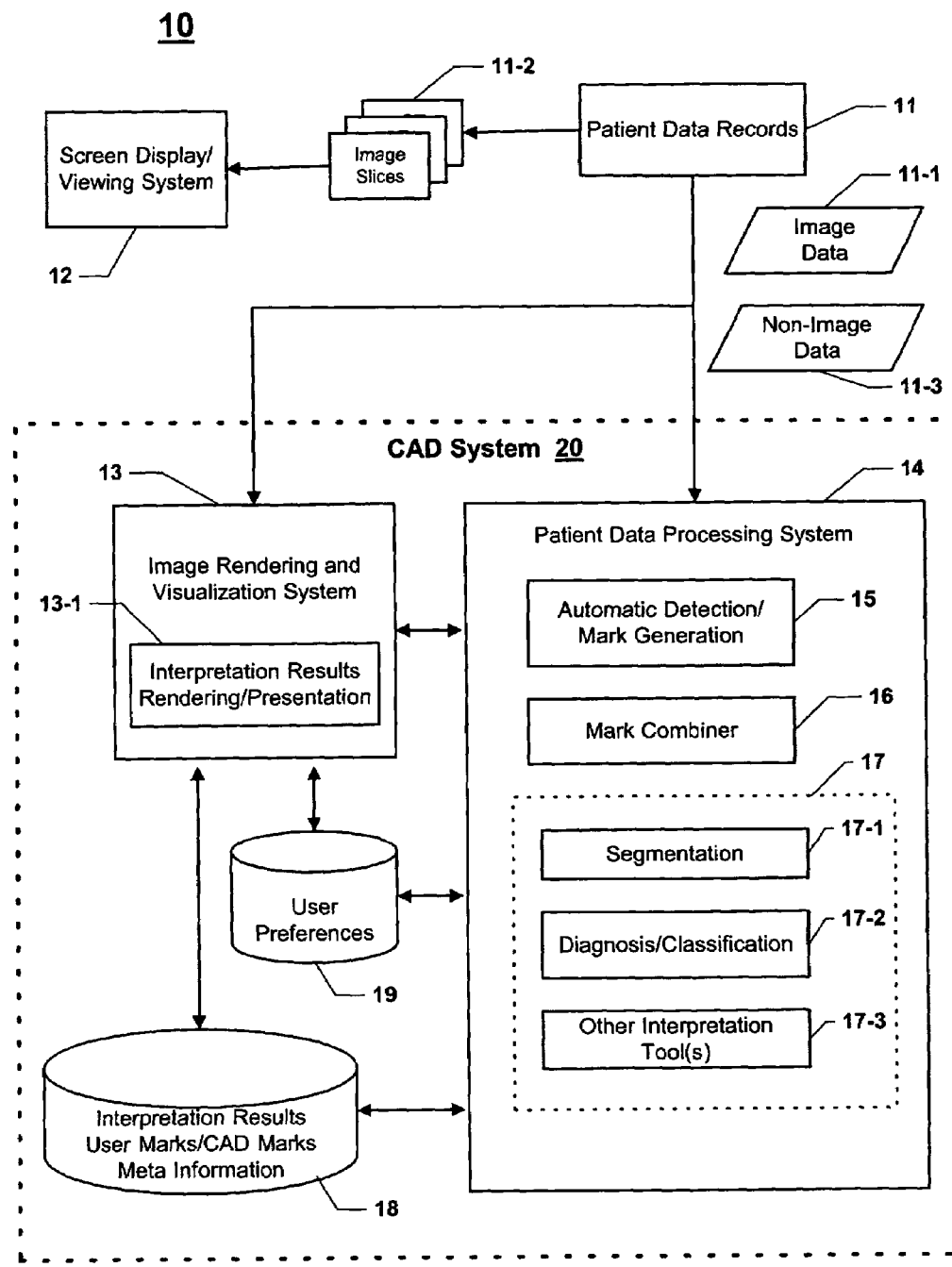
FIG. 1 is a block diagram of a system according to an exemplary embodiment of the invention for reviewing patient data and providing automated decision support for screening, evaluating, and/or diagnosing medial conditions.

FIG. 1 is a block diagram of a system (10) according to an exemplary embodiment of the invention, which enables review of patient data and provides automated decision support for, e.g., screening, evaluating, and/or diagnosing medial conditions. In general, the system (10) comprises a collection of patient data records (11), a screen display/viewing system (12), and a CAD (computer-aided decision) support system (20) (or CAD system (20)). The CAD system (20) generally comprises a 2D/3D image rendering and visualization system (13), a patient data processing system (14), and persistent storage mediums (18) and (19) for storing data that are used and/or generated by the various systems (13) and (14). As explained in detail below, the CAD system (20) implements methods for automatically processing and interpreting patient data using a plurality of different tools/methods, and integrating and presenting the interpretation results to a user (e.g., physician, radiologist, etc.) in a manner that enables fast and efficient screening/evaluation/diagnosis of potential medical conditions of a subject patient. The CAD system (20) may comprise an integrated application wherein the patient data processing system (14) and image rendering and visualization system (13) are implemented as a single application that executes in a computing system (e.g., workstation). Alternatively, the systems (13) and (14) may be independent systems/tools that are distributed over a computer network, wherein known communication protocols such as DICOM, PACS, etc. are used for communicating between the systems (13) and (14) and transmitting data over the network.

In one exemplary embodiment of the invention, the patient data records (11) comprise computerized patient records (CPR) (or electronic patient medical records) including various types of patient data comprising image data (11-1, 11-2) and non-image patient data (11-3) maintained in structured and/or unstructured data formats. More specifically, by way of example, structured patient data includes all types of non-image patient data such as financial (billing), demographic, laboratory, pharmacy data, etc., that is maintained in database tables or other structured formats with defined data fields. Unstructured sources of patient data include non-image patient data (11-3) such as free-text based documents comprising doctor progress notes, medical procedures, prescription drug information, radiological reports, other specialist reports, as well as image data and waveforms data.

The patient image data includes digital image data (11-1) in the form of raw image data, such as raw CT data (radon data) which is acquired during a CT scan or raw data that is acquired using other imaging modalities. Moreover, the digital image data (11-1) may comprise one or more 2D slices or three-dimensional volumetric images, which are reconstructed from the raw image data and persistently stored. The image data can be 2D (e.g. X-ray Mammography images), 3D (e.g. CT, MRI, PET), 4D (Dynamic 3D MRI, multiple views of a beating heart acquired with a 3D Ultrasound probe), etc. In addition, the patient data records (11) may comprise image data in the form of hard-copy 2D and/or 3D medical images (11-2) including X-ray films, prints, photographs, etc., of images that are reconstructed from acquired image data. For example, the medical images (11-2) may include a set of X-ray films including 2D slices of a patient that are reproduced from an image dataset acquired during a CT scan of a region of interest of the patient.

The screen display/viewing system (12) may be implemented using systems, devices or apparatus suitable for viewing reproduced medical images (11-2) or non-image data (e.g., clinical reports). For instance, the screen display/viewing system (12) may comprise a lighted screen apparatus that can be used by a physician, clinician, radiologist, etc., to view a plurality of X-rays films that are mounted on the apparatus, which are generated from an acquired image data set of multiple CT slices (11-2). The screen display/viewing system (12) may be implemented using any system that is suitable for scrolling through a plurality of reconstructed 2D slices, for example. The viewing system could also be a hardcopy, for example, a film-sheet that is viewed with a light box, or a paper printout, or other such means as known to those of ordinary skill in the art. The view system (12) may comprise a personal computer for generating and viewing electronic clinical reports, for example.

The image rendering and visualization system (13) may comprise any suitable system/tool/application that can process digital image data (11-1) of an acquired image dataset (or a portion thereof) to generate and display 2D and/or 3D images on a computer monitor. More specifically, the imaging system (13) may be an application that provides 3D/2D rendering and visualization of image data (11-1), and which executes on general purpose or application specific computer workstation having a monitor. Moreover, the imaging system (13) provides a GUI (graphical user interface), for example, which enables a user to navigate through a 3D image or a plurality of 2D slices.

In accordance with an exemplary embodiment of the invention, the image rendering and visualization system (13) comprises an interpretation results rendering/presentation module (13-1), which implements one or more methods for rendering and presenting data processing/interpretation results (or generally, "CAD results") (which are generated and output from the patient data processing system (14)) in a manner that enables fast and efficient user review/analysis of such CAD results. An exemplary method for presenting the CAD results in an integrated manner will be described below with reference to FIG. 4, for example.

The patient data processing system (14) comprises methods, functions and modules for processing image data (11-1) and/or non-image patient data (11-3) to provide computer-aided detection and diagnosis and other decision support functions as described herein. The patient data processing system (14) may comprise an application or tool that executes on a general purpose computer or a computer with specialized hardware. In the exemplary embodiment of FIG. 1, the patient data processing system (14) comprises a detection module (15), mark combiner module (16) and a plurality of CAD interpretation tools (17). The interpretation tools (17) comprise an automated segmentation module (17-1), a diagnosis/classification module (17-2) and one or more other interpretation tools (17-3).

In one exemplary embodiment of the invention, the detection module (15) implements one or more methods for processing a patient image dataset (11-1) to automatically detect or identify and mark regions of interest (e.g., abnormal anatomical structures) in the image dataset. More specifically, the detection module (15) implements methods for identifying, or at least localizing, certain features of interest, such as anatomical anomalies in the input image dataset (11-1) and adding markers (CAD marks) to the image data to indicate such features or regions. The digital image data (11-1) may be in the form of raw image data, 2D-reconstructed data (e.g., axial slices), or 3D-reconstructed data (volumetric image data or multiplanar reformats), 4D-reconstructed data, or other formats.

The detection results (identified/marked regions) output from the detection module (15) can be persistently stored (18) and/or output to the image rendering and visualization system (13) and presented to the user. For instance, the output of the detection module (15) may include CAD mark information and other meta information that is stored in the repository (18) in association with the subject image dataset (or a portion of the image data) for subsequent access. Further, the image rendering/visualization system (13) can render the detection results (output from the detection module (15) or accessed from the repository (18)) as overlays on 2D and/or 3D renderings of the image data to illustrate the marked regions of interest automatically detected by the detection module (15). The CAD marks may be rendered as pointers (arrows, crosshairs, etc,) that point to regions of interest having a potential abnormal structure or that point to a center location of a potential lesion or abnormality. Moreover, the CAD marks may be dotted lines that are formed around the perimeter or edge of a potential lesion or which generally encircle a region of interest that is detected/diagnosed as having a potential abnormal structure, for example.

It is to be appreciated that the methods implemented by the detection module (15) will vary depending one the imaging domains (type(s) of image data (11-1)) supported by the patient data processing system (14), as well as the type(s) of anatomical structures under consideration. The detection module (15) may include one or more methods for extracting relevant features, data, or image parameters from image data (11-1) for detecting/identifying regions of interest. For example, when detecting for breast cancer, various parameters related to optical density and contrast can be extracted to identify potential lesions in breast tissue. Various types of feature extraction methods that can be implemented for various medical applications and image domains are well known to those of ordinary skill in the art, and a detailed discussion thereof is not necessary and beyond the scope of the claimed inventions.

Moreover, the image rendering and visualization system (13) may include methods for enabling a user to manually mark (user marks) regions of interest in one or more locations of a subject image dataset that is rendered and displayed to the user, for example. More specifically, in addition to or in lieu of the automated detection process (15), one or more users (doctor, physician, etc.) can perform a manual detection process for a given image dataset and specify, identify or otherwise mark regions of interest in the image dataset. The user-specified marks and other related meta-information can be stored persistently in repository (18).

In accordance with an exemplary embodiment of the invention, one or more different interpretation tools (17) are automatically invoked to process the image data for one or more of manually (user) marked and/or CAD marked regions of interest in the image data set. More specifically, by way of example, in one exemplary embodiment of the invention, the data processing system (14) can be programmed to automatically invoke the interpretation tools (17) to seamlessly process one or more or all of user and/or CAD-specified marks for a given image dataset. This is in contrast to conventional methods as noted above which require a user to separately invoke CAD tools at each detected region of interest. In accordance with an exemplary embodiment of the invention, the set of interpretation tools and/or sequence of processing of such tools, for example, may be specified via user preference information (19). In this regard, a user can specify one or more of the different interpretation tools (17) are automatically invoked for processing/analyzing the CAD marks.

In one exemplary embodiment of the invention, the mark combiner module (16) comprises methods for combining the information regarding user-specified and CAD marks for a subject image dataset before processing of the subject image dataset by the various interpretation tools (17). The mark combiner module (16) may comprise methods for removing redundant marks before processing by the interpretation tools (17). For example, if a particular region of interest has been "marked" more than one time (e.g., with a user and CAD mark), the extra mark(s) can be discarded to avoid processing the same region of interest more than once.

The various types of interpretation tool (17) implemented by the data processing system (14) can vary depending on the relevant medical domain and type of patient data to be processed, for example. In the exemplary embodiment of FIG. 1, the segmentation module (17-1) may be employed for processing each marked region of interest. The segmentation module (17-1) implements one or more methods for segmenting features or anatomies of interest by reference to known or anticipated image characteristics, such as edges, identifiable structures, boundaries, changes or transitions in colors or intensities, changes or transitions in spectrographic information, etc, using known methods. For instance, the segmentation module (17-1) is invoked to process each ROI to determine the boundary between a potential lesion or abnormal anatomical structure and surrounding normal anatomical tissue and structures and extract the relevant volume associated with such lesion or abnormal structure. Various types of segmentation methods that can be implemented are well known to those of ordinary skill in the art, and a detailed discussion thereof is not necessary and beyond the scope of the claimed inventions.

The diagnosis/classification module (17-2) implements methods for processing image data for detected regions of interest to evaluate, diagnose or otherwise classify abnormal anatomical structures (lesions) such as colonic polyps, aneurisms or lung nodules. Various types of methods that can be implemented for automated diagnosis/classification are well known to those of ordinary skill in the art, and a detailed discussion thereof is not necessary and beyond the scope of the claimed inventions.

Depending on the application, or relevant medical and image domains, the patient data processing system (14) can implement one more other interpretation tools (17-3) for processing patient data (image data and/or non-image data). For instance, methods can be implemented that can be used to obtain accurate size measurements and other descriptive characteristics of segmented lesions/features/structures, which information can be useful for automated identification and classification.

Figure 5:
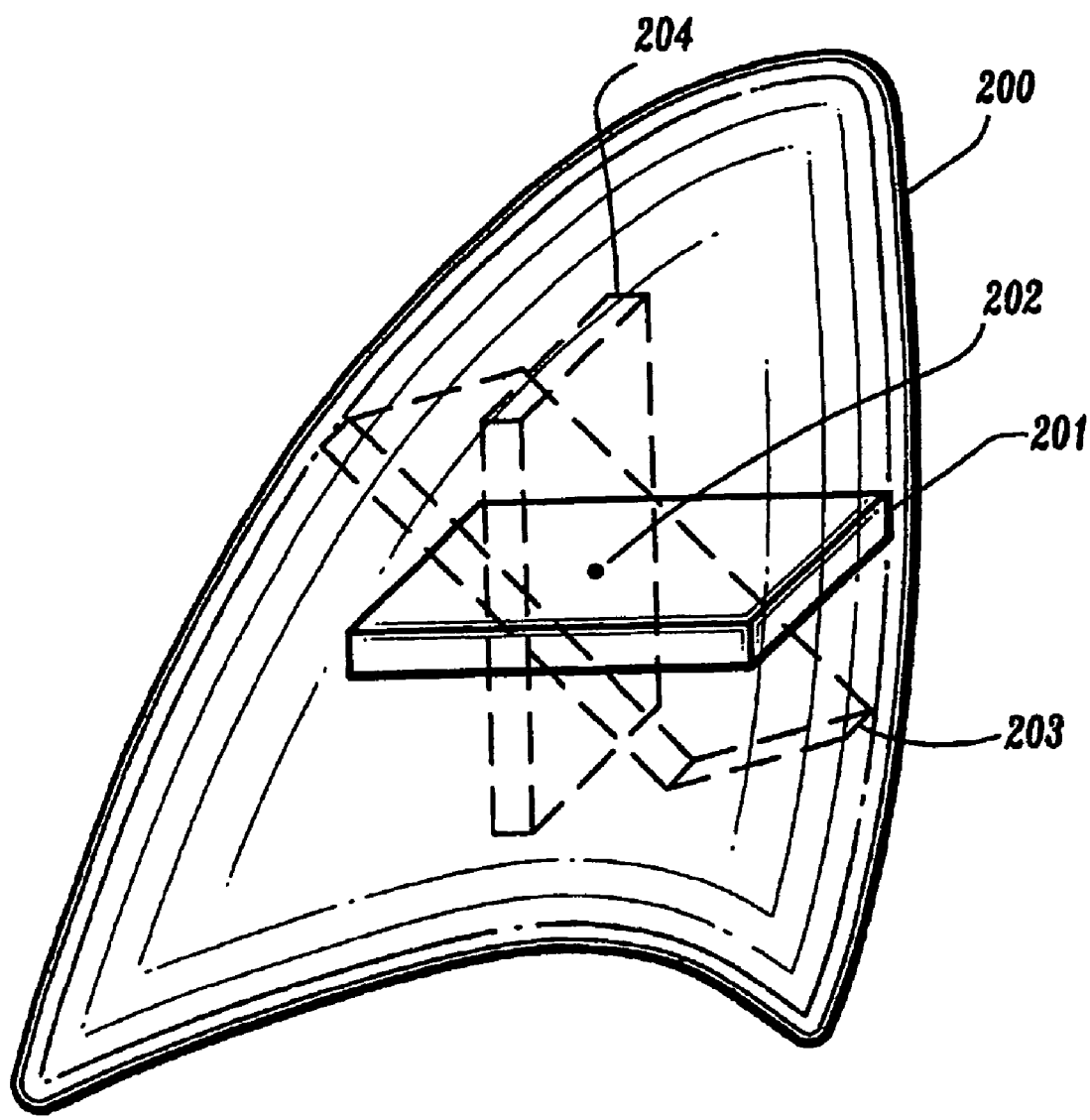
FIG. 5 is a diagram illustrating a cartwheel projection of an image slice centered at an object of interest.

Moreover, by way of example, the interpretation tools (17-3) may include methods for performing a cartwheel projection analysis, such as described in U.S. Pat. No. 6,609,021, which is fully incorporated herein by reference. Briefly, this patent describes methods that enable manual and automated detection of abnormal anatomical structures such as lung nodules in CT images using a cartwheel projection analysis. For example, FIG. 5 is an exemplary diagram that illustrates a cartwheel projection of an image dataset (e.g., multiple 2D slices, or 3D volume) of an object of interest (200) (e.g., lung). A seed point (e.g., CAD or user mark) (202) indicates a point/voxel in the image (200) that warrants closer examination (e.g., the seed point (202) may point to a suspicious structure that requires detailed examination). As depicted in FIG. 5, a spinning projection plane (201) is rotated 180 degrees, around the point of interest (202), and a series of 2D projection of the axial image slice (cartwheel projection image slices) such as cartwheel projection image slices (203) and (204), are obtained. The rotation angles can be set at predefined intervals, such as, for example, every 5 degrees, in which case 36 individual cartwheel projection image slices would be generated for each input object of interest on a given axial image slice. Likewise, if the interval was set to 1 degree, 180 individual cartwheel projection image slices would be generated for each input object of interest.

In accordance with an exemplary embodiment of the invention, a cartwheel projection can be applied to each user/CAD-specified mark (as depicted in FIG. 5), to generate a plurality of two-dimensional cartwheel projection image slices that are stored/presented for further analysis or review. These set of projection images can be evaluated to determine the three-dimensional shape of an object/feature.

Moreover, in other exemplary embodiments of the invention, in FIG. 1, as noted above, the data processing system (14) may include tools/methods for extracting, analyzing, interpreting, etc, relevant information from non-image patient data (11-3) for purposes of decision support. For example, the patient data processing system (14) may include one or more patient data extraction methods for extracting "non-image" patient data from structured and/or unstructured patient data records (11), which may be relevant for a clinical/image domain under consideration, and combining the image features/parameters and non-image features/parameters in a manner that is suitable analysis by the various CAD tools. More specifically, data analysis/data mining methods may be implemented for extracting relevant parameters from the all types of patient data records (11), such as described in commonly assigned and copending U.S. Pat. application Ser. No. 10/287,055, filed on Nov. 4, 2002, entitled "Patient Data Mining", which claims priority to U.S. Provisional Application Ser. No. 60/335,542, filed on Nov. 2, 2001, which are both fully incorporated herein by reference.

Although non-image patient data may not pinpoint specific regions of potential abnormalities, for example, such non-image data may be implemented by one or more interpretation tools (17) for purposes of evaluation medical conditions. In particular, depending on the relevant medical domain (e.g., breast cancer, heart disease, etc.) non-image data (11-3) found in a patient's record such as, e.g., demographic data, history and physical information, physician notes, lab results, results from blood tests, results from proteomic analysis, and results from genetic assays, for example, can include a significant amount of useful data indicative of certain medical conditions. By way of example, for diagnosing/screening for heart disease, clinical information may be found in history and physical notes, wherein a physician notes that a person has experienced chest pain. In addition, certain diseases, such as diabetes, can increase the potential of a person developing/having coronary artery disease. Other indications, such as cholesterol level, history of smoking, family history of coronary artery disease, age, gender, etc., can also be used to assess the risk of coronary artery disease.

In one exemplary embodiment of the invention, the diagnosis/classification module (17-2) can implement methods for processing both non-image data and image data for detected/identified (marked) regions of interest to evaluate, assess, diagnose or otherwise classify abnormal anatomical structures (lesions) such as colonic polyps, aneurisms or lung nodules. More specifically, the diagnosis/classification module (17-2) can provide an assessment of a particular condition together with a measure of confidence in the assessment, based on a set of features extracted from image data and/or non-image patient data using, for example, one or more classification methods that are trained to analyze such combined features.

Figure 4:
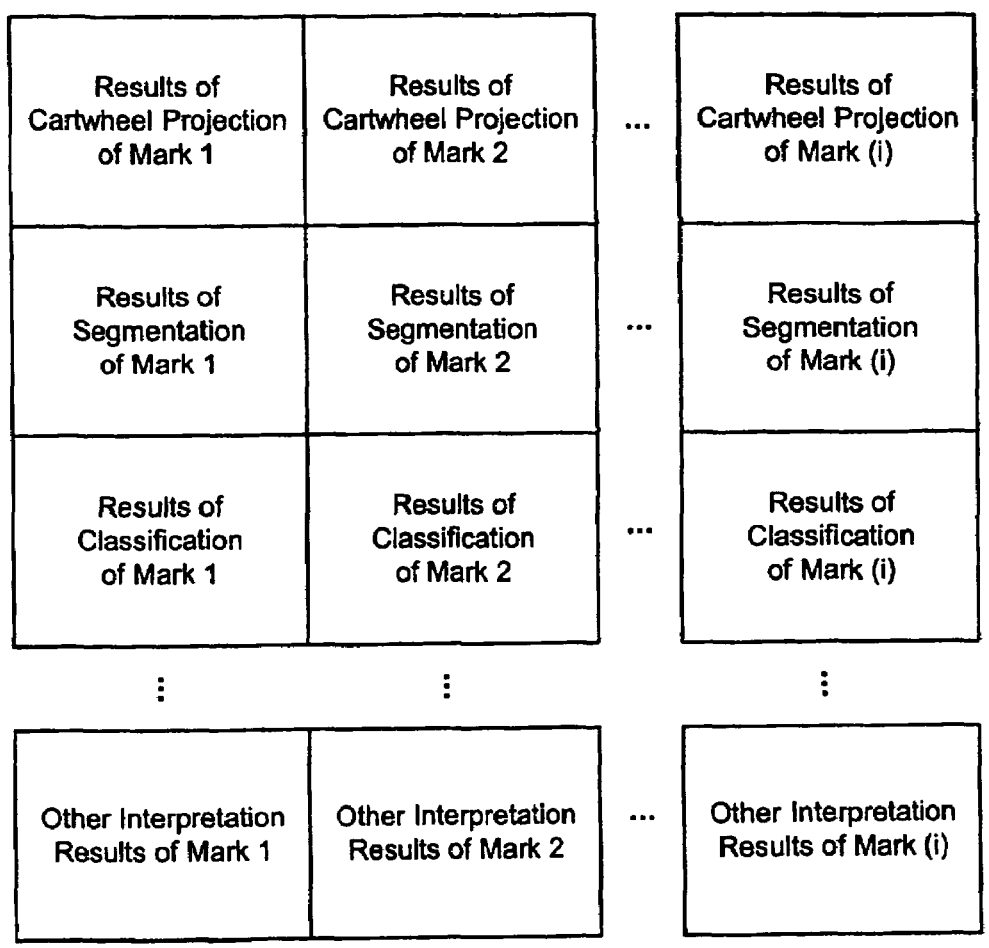
FIG. 4 schematically illustrates a method for presenting interpretation results generated by a CAD process for user review, according to an exemplary embodiment of the invention.

The CAD results (e.g., results of each invoked interpretation process) and relevant meta information can be persistently stored in repository (18). The interpretation results rendering/presentation module (13-1) can be invoked to present interpretation results in an integrated fashion. For example, FIG. 4 schematically illustrates one exemplary embodiment of a GUI window that can be used to display the CAD results for each user/CAD marked region of interest in an integrated manner. More specifically, FIG. 4 depicts an exemplary GUI window (40) comprising a plurality of regions arranged in rows and columns. As depicted, each column comprises separate regions to present the results of each invoked interpretation tool for a given marked region.

In particular, the exemplary GUI window (40) depicts the results of a cartwheel projection analysis, segmentation, classification, and other CAD assisted interpretation methods for each of a plurality of marks (M1, M2, . . . M(i)). The results of the cartwheel projection may be presented as a sequence of 2D images that enables the user to determine the shape of a particular marked object/feature of interest. The segmentation results may be depicted as a 3D image of the extracted image volume of a particular marked object/feature of interest. The diagnosis/classification results may be presented in text form, providing an assessment, diagnosis, etc. of a particular marked object/feature of interest.

It is to be understood that CAD systems and methods according to the present invention may be implemented as extensions to conventional CAD methods or other automated diagnostic methods for processing image data. Further, it is to be appreciated that the exemplary systems and methods described herein can be readily implemented with 3D medical imaging and CAD systems or applications that are adapted for a wide range of imaging modalities (CT, MRI, etc.) and diagnosis and evaluation of various abnormal anatomical structures or lesions such as colonic polyps, aneurisms, lung nodules, etc. In this regard, although exemplary embodiments may be described herein with reference to particular imaging modalities or particular anatomical features, nothing should be construed as limiting the scope of the invention.

Figure 2:
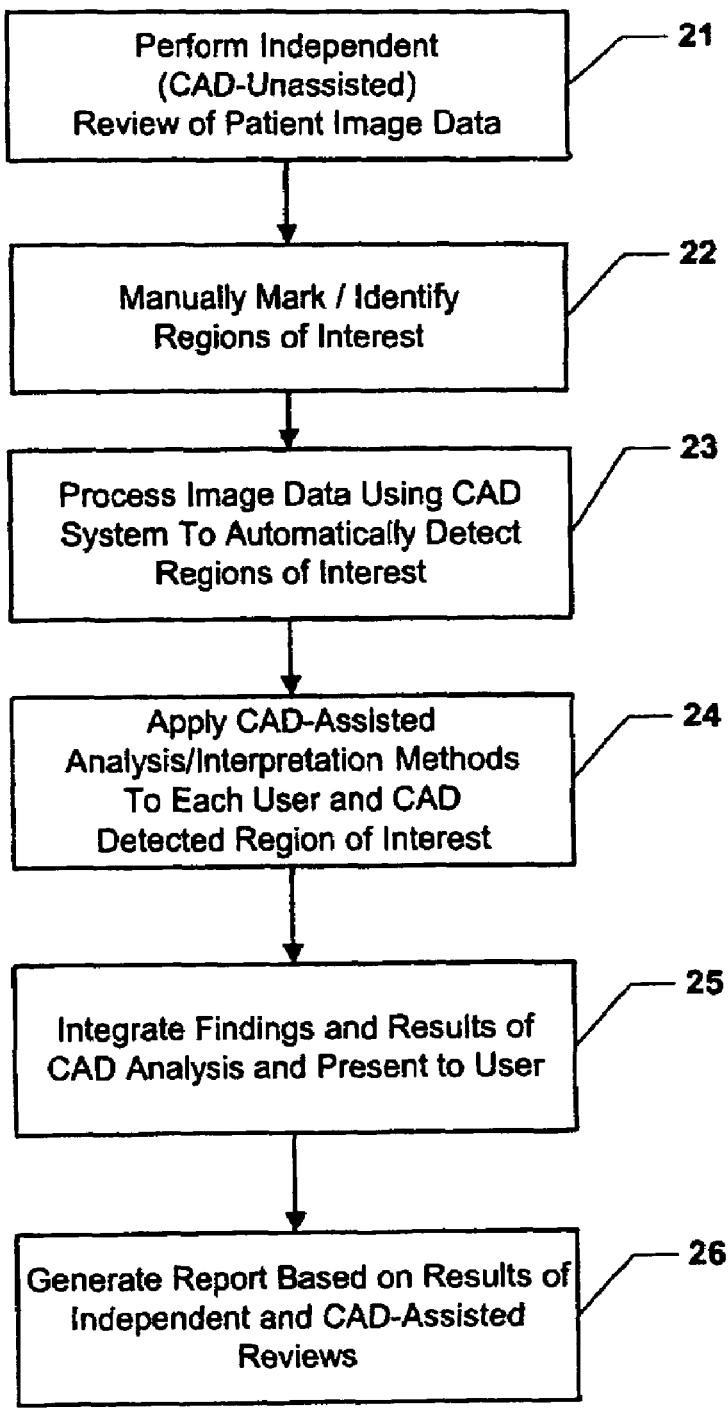
FIG. 2 is a flow diagram illustrating workflow processes for physician review and interpretation of patient data for screening, evaluating, and/or diagnosing medical conditions, according to exemplary embodiments of the invention.

Referring now to FIG. 2, a flow diagram illustrates a workflow for physician review and analysis of patient image data according to an exemplary embodiment of the invention. For purposes of illustration, the exemplary method of FIG. 2 will be described with reference to the system of FIG. 1. Referring now to FIG. 2, one or more users (physician, clinician, radiologist, etc.) can perform a preliminary, independent (CAD-unassisted) review and analysis of patient image data of a subject patient (step 21) to identify potential abnormal anatomical structures or disease states, if any. For example, in one embodiment of the invention, the user could use the screen display/review system (12) (FIG. 1) to review one or more x-ray films of 2D image slices, which are generated from an image dataset acquired via a CT exam, for example.

In another exemplary embodiment, the user could review 2D and/or 3D renderings of the image dataset, which are displayed on a computer monitor to identify possible abnormal features. For example, the image visualization system (13) (FIG. 1) can be used to render and display 2D and/or 3D images of the all or portions of the input image dataset, and navigate through the displayed images using a suitable GUI, enabling the user to identify and manually mark potential abnormal features. In such case, the visualization system (13) simply constructs and displays 2D and/or 3D images for user review, but does not perform CAD related functions to assist in the analysis, nor display images that are rendered and displayed based on CAD results.

Based on the initial review, the physician may manually mark or otherwise identify regions of interest in image data (step 22), which are believed by the user to include (or to be) potential lesions or anatomical anomalies. Moreover, using related GUI functions for the visualization system (13), the physician may mark or otherwise highlight particular regions of the displayed 2D and/or 3D images. The physician may possibly generate a preliminary report of his/her initial findings based on the CAD-unassisted review of the patient image data. This report may comprise preliminary diagnostic decisions and findings of the physician, including references to particular regions (or features) of interest in the image data.

The physician can perform a CAD-assisted analysis/review of the patient image data to verify or reconcile his/her preliminary findings. In general, in one exemplary embodiment of the invention, a CAD-assisted analysis/review includes processing the image dataset (which was, or will be, the subject of the preliminary review) using the CAD system to automatically detect and mark potential lesions or other abnormal anatomical structures in the image data (step 23) and invoke a plurality of tools/methods to analyze and interpret the image data for the user/CAD-detected/marked regions of interest (step 24). Various methods for implementing steps 23 and 24 according to exemplary embodiments of the invention will be discussed below with reference to FIG. 3 for example.

Thereafter, the findings/results of each CAD analysis for the user/CAD-detected regions of interest are presented in an integrated manner for review by the user (step 25). It is to be appreciated that various methods according to exemplary embodiments of the invention may be implemented for presenting the CAD results for each marked/detected region of interest for user review. In general, the CAD system (20) can process all marked regions of interest in a batch mode and present the finding/results (via GUI, printout, etc.) for one or more or all marks simultaneously, or for each mark separately, for example. The interpretation results can be stored and then rendered/presented at a subsequent time upon user request, or such results can be rendered/presented in real time as they are generated. It is to be appreciated that the manner in which CAD results are presented to a user can be set based on user preferences (19) (FIG. 1), for example.

In one exemplary embodiment of the invention, the CAD results can be combined and displayed using the exemplary window layout as depicted in FIG. 4, although other method/layouts can be readily envisioned by one of ordinary skill in the art. Indeed, when a significant number of tools are implemented and/or when a large number of marks (regions of interest) are evaluated, there may not be sufficient space to present all results for all marks in one window as in FIG. 4. Therefore, in one exemplary embodiment, the set of interpretation results for each "mark" can be presented (e.g., displayed) one at a time, or rendered in different user selectable GUI windows. In another exemplary embodiment, the interpretation results for each mark for one or more invoked interpretation tools can be simultaneously presented (e.g., the segmentation results for each marked regions will be displayed) for review by the user. Furthermore, in another exemplary embodiment of the invention, the interpretation results for a given mark can be presented (e.g., displayed) as generated. In this manner, the interpretation tools can be automatically invoked for each mark in a specified sequence (e.g., user specified sequence) such that the initial invoked tool(s) will provide a fast indication as to whether a potential medical condition exists. For example, when detecting lung nodules, a cartwheel projection may enable a physician to determine whether the region of interest contains a nodule based on the shape of the object of interest as shown in a series of slices. In this manner, the user may command the system to terminate processing for a particular mark (e.g., don't invoke the remaining interpretation tools for the given mark) and commence processing of the next mark. It is to be appreciated that based on the teachings herein, one of ordinary skill in the art can readily envision other methods for rendering and presenting interpretation results in accordance with the invention, which enable fast and efficient review of CAD marks, and nothing herein shall be construed as limiting the scope of the invention.

Following the CAD-assisted review, the physician can augment his/her preliminary report based on the final diagnostic decision (step 26). This final diagnostic report may or may not be the same as the preliminary report, depending on whether the physician determines additional diagnostic information provided by the CAD tool to be significant. Following the final diagnostic report, the physician can recommend a course of further action, which can include no further action or further follow-up examinations or procedures.

It is to be understood that the physician workflow process of FIG. 2 is merely one exemplary embodiment of the invention and other workflows can be readily envisioned.

For example, the CAD-assisted processing of a given image dataset may be performed "off-line" prior to an independent, CAD-unassisted review of the image dataset. Moreover, the CAD process may be executed as a background process during an independent review of such image data. Further, CAD processing may occur after an independent review by the user explicitly executing the patient data processing system (14) to process image data currently displayed with marks for user detected regions of interest (e.g., via system 13) for the CAD-unassisted review.

Figure 3:
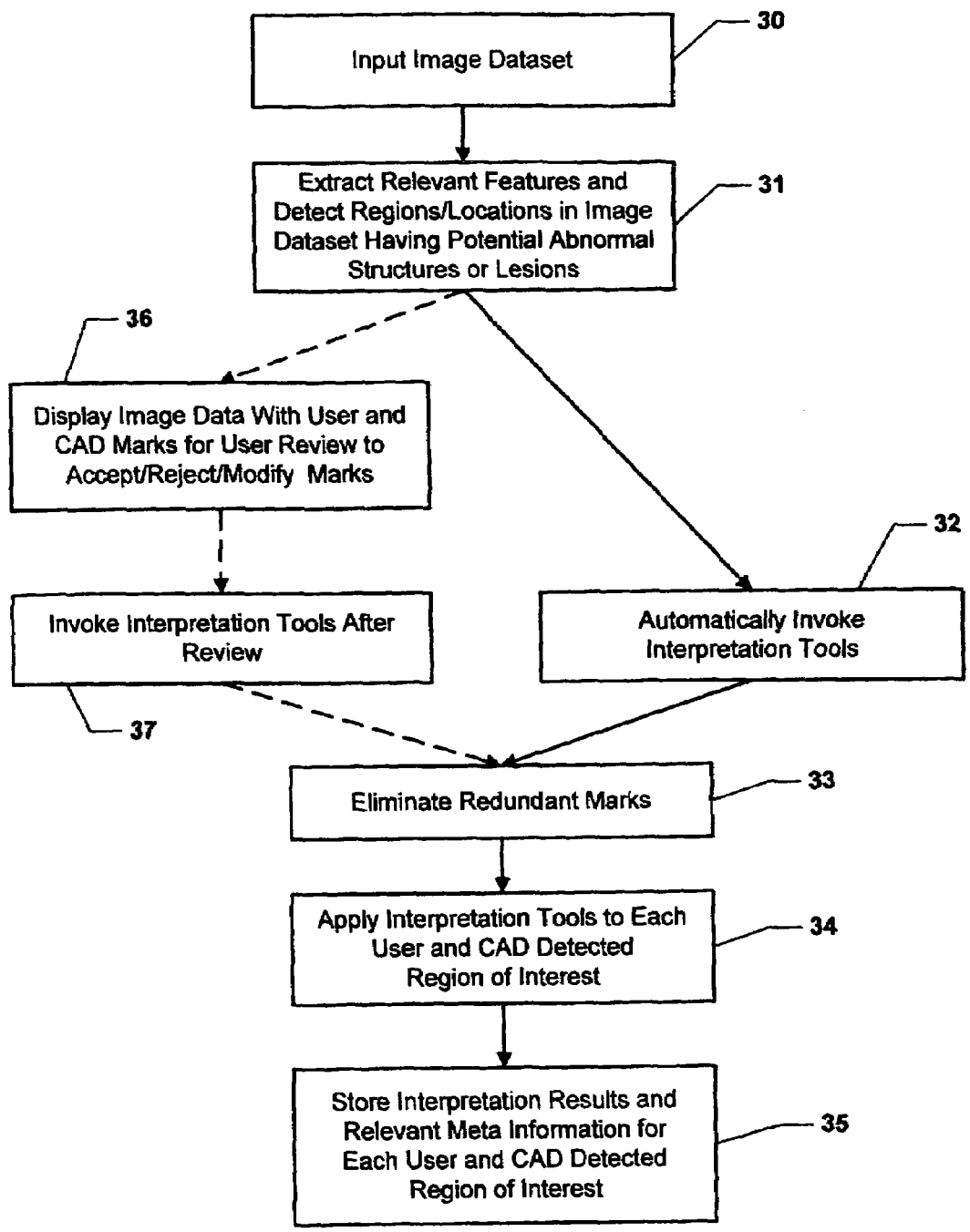
FIG. 3 is a flow diagram of illustrating CAD decision support methods according to exemplary embodiments of the invention.

Moreover, it is to be appreciated that various methods may be used for implementing the CAD-assisted analysis/review (steps 23, 24 and 25). For example, FIG. 3 is a flow diagram that illustrates a CAD method according to an exemplary embodiment of the invention. In one embodiment of the invention, FIG. 3 depicts methods that can be implemented for steps 23 and 24 of FIG. 2. In another embodiment of the invention, FIG. 3 illustrates a mode of operation of the patient data processing system (14) of FIG. 1.

Referring to FIG. 3, an image dataset of a subject patient is input to the CAD system (step 30), which may or may not have manually marked (detected) regions of interest. The input image dataset is processed to extract relevant image features and automatically detect and identify regions (or features) of interest, if any, in the image dataset that are identified as having potential abnormal anatomical structures (step 31). It is to be understood that the extraction and detection methods may be implemented using any method which is suitable for the imaging modality (e.g., CT) of the input image data and which is specifically or generally adapted for detecting/diagnosing anatomical abnormalities (e.g., cancer, polyps, nodules, etc.) that are under consideration. The CAD process will automatically mark those regions of interest in the input image dataset, which are determined to be potential lesions or other abnormal structures.

After completion of the automated detection process (step 31), the CAD system will automatically invoke a plurality of interpretation tools to be applied to user and CAD detected (marked) regions of interest (step 32). In one exemplary embodiment, a method is implemented for identifying and eliminating redundant marks (step 33). This process prevents unnecessary processing of the image data set for marks that are associated with the same user and/or CAD detected regions of interest. For instance, the image dataset may include two or more user (manually inserted) marks for the same region of interest as a result of independent, CAD-unassisted reviews of the same image dataset by various doctors, physicians, etc. Moreover, the automated detection process may detect and mark potential regions of interest that were already identified and manually marked by the user. In such instances, the redundant marks will be disregarded such that the same regions of interest are not process multiple times.

Thereafter, each user and CAD detected/marked ROI will be automatically processed using each of the invoked interpretation methods (step 34). For instance, each ROI may be processed using the interpretation tools (17) discussed above (e.g., segmentation, classification, cartwheel analysis, etc.). The results of the interpretation/analysis and relevant meta information for each user and CAD detected region of interest will be persistently stored (step 35). Such information includes, for example, e.g., the locations of the mark and other types of supporting data including the image sub-volume data and extracted features, etc. The results and relevant data can be subsequently accessed and processed for presentation (e.g., via GUI) to a user in an integrated fashion that enable fast review of the detected ROIs.

It is to be appreciated that the above-described process (steps 30~35) may be a fully automated process that can be executed via a single command. For instance, a GUI of the CAD system may allow a user to access and select a desired image data file, and select a single command (via GUI button or menu, etc.) to commence the CAD process and store the various analysis/interpretation results for detected ROIs for subsequent access. As noted above, the CAD process may be performed prior to or during a CAD-unassisted review. In such instances, the stored CAD results and meta information are associated with only CAD detected ROIs. Therefore, before reviewing the CAD results, one or more users can perform independent reviews of an image data set and command the CAD system to apply the interpretation tools to the user detected ROIs (which are not redundant with regard to the previously automatically detected ROIs) and merge the results with the previously stored results and present the integrated results to the user.

In another embodiment of the invention, as depicted in FIG. 3, after the automated detection (step 31), the image data may be rendered and displayed (2D and/or 3D) with the CAD marks (and possibly the user marks) to allow the user to accept, reject or otherwise modify one or more marks (step 36). For example, the output of the detection module (15) (e.g. "marked" image data) (FIG. 1) can be input to the image rendering/visualization system (13), which generates and displays one or more 2D and/or 3D medical images showing computer-generated marks (CAD marks), if any, based on the results of the CAD process. In other words, the displayed images may be marked or otherwise annotated with a localized identification of potential abnormalities that are detected by the detection module (15). The physician can interact with the system via a GUI by adding new user marks to the image data in regions of interest that the physician believes include potential abnormalities not found by the CAD process. Moreover, the physician may reject or otherwise delete CAD marks that were found by the CAD process, but which the physician believes are erroneous, or otherwise accept CAD marks that the physician believes are accurate. Thereafter, the user can invoke (via a command) the interpretation tools for the user and/or CAD marks after the review (step 37). This process enables a user to prevent processing of erroneous or undesired marks.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for providing computer-aided decision (CAD) support within an image processing apparatus, comprising:
marking image data with a plurality of marks indicating a plurality of automatically identified regions of interest;
marking the image data with a plurality of marks indicating a plurality of manually identified regions of interest;
combining the marks indicating the plurality of automatically identified regions of interest with the marks indicating the plurality of manually identified regions of interest;
automatically invoking a plurality of interpretation tools to process the combined marked regions of interest of the image data; and
outputting interpretation results generated by each invoked interpretation tool.

2. The method of claim 1, wherein marking image data with a plurality of marks indicating a plurality of automatically identified regions of interest includes determining a plurality of CAD-specified regions of interest and associating a mark with each determined CAD-specified region of interest.

3. The method of claim 1, further comprising automatically presenting one or more of the interpretation results for user review.

4. The method of claim 1, further comprising automatically displaying one or more of the interpretation results for user review.

5. The method of claim 4, wherein automatically displaying comprises simultaneously displaying each of the interpretation results in a separate region of a GUI window.

6. The method of claim 4, wherein automatically displaying comprises sequentially displaying the interpretation results.

7. The method of claim 1, wherein the one or more of the plurality of interpretation tools comprises an automated segmentation method.

8. The method of claim 1, wherein the one or more interpretation tools comprises an automated diagnosis method.

9. A computer-readable medium, tangibly embodying a program of instructions executable by a computer to perform method steps for providing computer-aided decision (CAD) support, the method steps comprising:
- marking image data with a plurality of marks indicating a plurality of automatically identified regions of interest;
- marking the image data with a plurality of marks indicating a plurality of manually identified regions of interest;
- combining the marks indicating the plurality of automatically identified regions of interest with the marks indicating the plurality of manually identified regions of interest;
- automatically invoking a plurality of interpretation tools to process the combined marked regions of interest of the image data; and outputting interpretation results generated by each invoked interpretation tool.

10. The computer-readable medium of claim 9, wherein marking image data with a plurality of marks indicating a plurality of automatically identified regions of interest includes determining a plurality of CAD-specified regions of interest and associating a mark with each determined CAD-specified region of interest.

11. The computer-readable medium of claim 9, further comprising instructions for automatically presenting one or more of the interpretation results associated with the at least one region of interest for user review.

12. The computer-readable medium of claim 9, further comprising instructions for automatically displaying one or more of the interpretation results for user review.

13. The computer-readable medium of claim 12, wherein the instructions for automatically displaying comprise instructions for simultaneously displaying each of the interpretation results in a separate region of a GUI window.

14. The computer-readable medium of claim 12, wherein the instructions for automatically displaying comprise instructions for sequentially displaying the interpretation results.

15. A method for providing computer-aided decision (CAD) support within an image processing apparatus, comprising the steps of:
- extracting information from patient data including image data and non-image data;
- marking the image data with a plurality of marks indicating a combination of automatically and manually identified regions of interest;
- removing duplicate markings from the plurality of marks;
- automatically invoking a plurality of interpretation tools and processing the extracted information using each of the invoked interpretation tools; and
- outputting interpretation results generated by each invoked interpretation tool.

* * * * *